V. M. HEATH.
Improvement in Clothes-Rack.
4,505.
Reissued August 8, 1871.
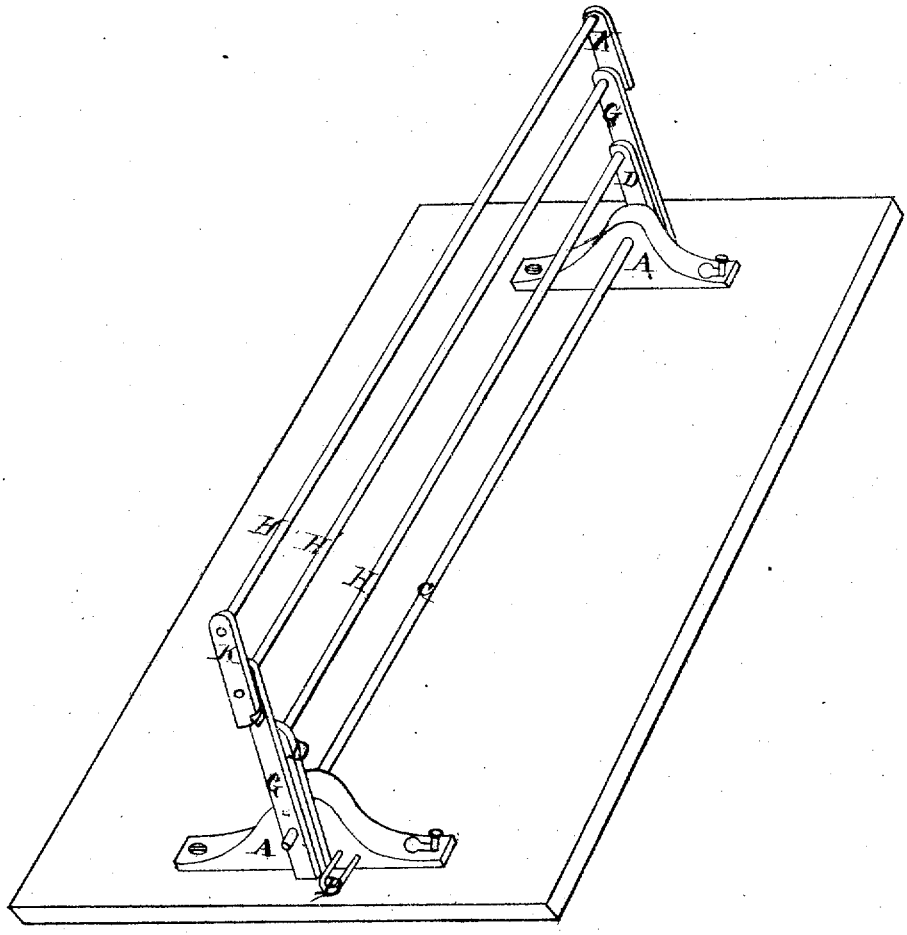
Witnesses.
E. H. Bates
Villette Anderson.
Inventor:
V. M. Heath
Chipman & Fosmer & Co
Attys.
AM. PHOTO-LITHOGRAPHIC CO. N.Y. (OSBORNE'S PROCESS.)

UNITED STATES PATENT OFFICE.

VILAS M. HEATH, OF MORRISTOWN, VERMONT.

IMPROVEMENT IN CLOTHES-RACKS.

Specification forming part of Letters Patent No. 94,598, dated September 7, 1869; reissue No. 4,505, dated August 8, 1871.

*To all whom it may concern:*

Be it known that I, VILAS M. HEATH, of Morristown, in the county of Lamoille and State of Vermont, have invented certain new and useful Improvements in Clothes-Racks; and I do hereby declare that the following is a full, clear, and exact description thereof, reference being had to the accompanying drawing and to the letters of reference marked thereon making a part of this specification.

My invention has relation to racks for the suspension or reception of clothes or other articles; and it consists in the construction of a series of arms extending outward from a horizontal axis of support and successively pivoted each to the preceding arm, in the manner hereinafter described, whereby the said arms are adapted to be readily folded up out of the way when not in use; also, in connection with the extension arms, the removable suspension brackets.

The accompanying drawing represents a perspective view of my rack.

A designates the supports or brackets, by means of which the rack is secured to and braced against the wall. These brackets each have cut in their upper portions a pear-shaped slot, wider at the bottom than at the top, by means of which they are readily slipped over the screws or nails upon which they are to hang. By means of these slots the rack can be put up or taken down. If it be desired to retain it permanently in one place the lower ends can be secured by the means of screws or nails; or the supports may be hung up by means of the hooks B which extend outward from their sides. C designates a bar extending from one bracket to the other and secured to the same. When the brackets are properly hung on a level with each other this bar serves to keep them firm and steady and in proper relation. D D represent arms pivoted to the bar C and vibrating vertically in contact with the side of the brackets in which the stops B are secured. G G represent longer arms pivoted in a similar manner to the bar C. These arms are connected by the horizontal bars H H, on which the clothes are to be hung. K K represent supplementary arms pivoted to the bar H′, which joins the arms G G at their outer ends, small stops or pins *a* being secured to the sides of the arms to prevent them from dropping below the general level of the other arms unless required. In a similar manner these arms may be multiplied indefinitely, each pair being pivoted to the transverse bar of the preceding pair, in the manner indicated.

When the number of pieces to be dried is small only a portion of the rack need be lowered, while the other part remains turned up out of the way.

The entire rack may be taken down in a few minutes and folded up for storage when not in use.

What I claim as my invention, and desire to secure by Letters Patent, is—

1. In a clothes-rack, the series of folding extension arms, each pivoted to and supported by the preceding arm, the outer frame being supported by braces *a*, substantially as specified.

2. In a clothes-rack, the slotted suspension brackets A, in combination with the series of independent folding extension arms and braces *a*, constructed and arranged substantially as specified.

3. The combination of the slotted supports A, bars C and H, arms D, G, and K, and stops *a*, substantially as specified.

In testimony that I claim the above I have hereunto subscribed my name in the presence of two witnesses.

VILAS M. HEATH.

Witnesses:
J. M. CHATTERTON,
D. N. FARRANT.